(No Model.)
J. R. MENTZER.
DADO CUTTER.
No. 384,209. Patented June 5, 1888.
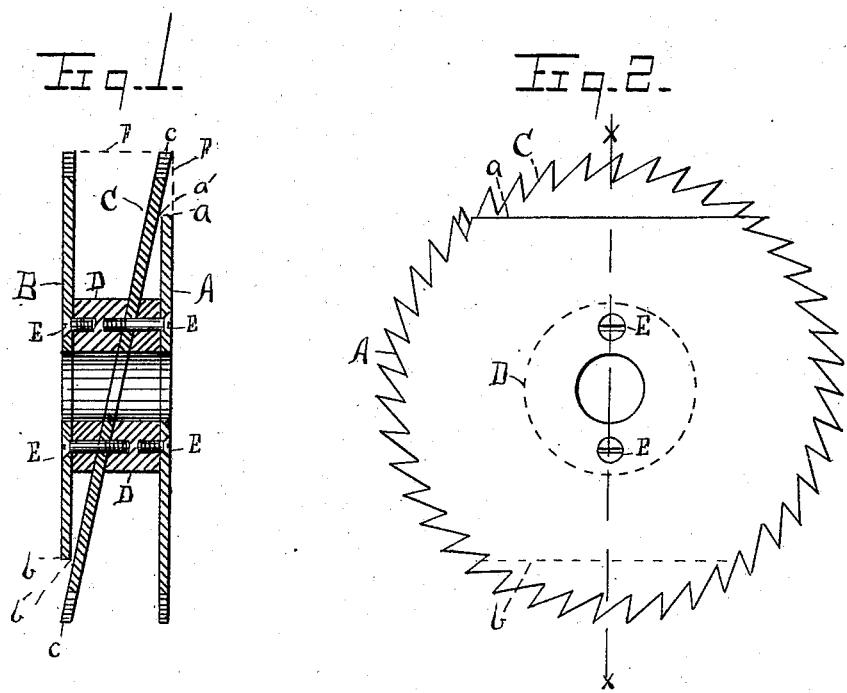
WITNESSES:
Arthur C. Denison.
Edward B. Escott.
INVENTOR.
Jonathan R. Mentzer,
BY Edward Taggart,
his ATTORNEY

United States Patent Office.

JONATHAN R. MENTZER, OF GRAND RAPIDS, MICHIGAN, ASSIGNOR, BY DIRECT AND MESNE ASSIGNMENTS, TO WILLIAM R. FOX, OF SAME PLACE.

DADO-CUTTER.

SPECIFICATION forming part of Letters Patent No. 384,209, dated June 5, 1888.

Application filed May 27, 1886. Serial No. 203,486. (No model.)

*To all whom it may concern:*

Be it known that I, JONATHAN R. MENTZER, a citizen of the United States, residing at the city of Grand Rapids, in the county of Kent and State of Michigan, have invented a new and useful Improvement in Dado-Cutters, of which the following is a specification.

My invention relates to that class of dado-cutters consisting of a series of revolving saws; and the objects of my improvement are, first, to secure an even cut with straight edges; second, to secure uniformity of cut at whatever speed the device is run; third, to prevent that injury to the operation of the device which is usually caused by the wearing away of the saws; fourth, to make a dado-cutter which shall be adjustable to different widths of cut. I attain these objects by the mechanism illustrated in the accompanying drawings, in which—

Figure 1 is a sectional view of my device on line $x$ $x$ of Fig. 2, and Fig. 2 is a plan view of the device as it appears from one side.

Similar letters refer to similar parts in the two views.

A and B are saws in the ordinary form, set at such a distance apart as the cut is desired to be wide, and held upon the arbor in the usual form.

C is a wabble-saw held in the position shown by the collars D D and the screws E E.

As shown, the collars D have outer faces which are parallel to each other and against which the outer parallel saws bear, being held thereto by the screws E, while their inner faces are cut inclined to allow of the wabble-saw C being clamped between them. The inclination of the faces is determined by the angle which it is desired to have the saw C assume.

The saws A and B are cut away, as shown at $a$ and $b$, the saw A being cut at $a$ and the saw B at $b$, as particularly shown in Fig. 2. There are thus left between the straight saws A and B and the wabble-saw C openings $a'$ and $b'$, which permit the escape of the sawdust that might otherwise accumulate and clog the saws. This arrangement of the saws and cutting away of portions of the outside saws also permits the cut of the saw C to overlap the cut of the saws A and B, so as to insure a perfectly clean cut by the wabble-saw the entire distance between the two side saws, and it is obvious that this result will follow so long as any portion of the saw C projects into the cut made by the side saws, A and B. So long, therefore, as the saw C overlaps in the manner shown the saws A and B they may be reduced in diameter by wear or otherwise without affecting the efficiency and completeness of the operation of the device. I have found that for slight adjustment of the saw C a packing of paper may be inserted between the outer saws and the collars against which they bear.

The screws E are not essential, but can, if desired, be omitted, and pins used in their place.

In the operation of my device it is rotated in the usual manner and applied to the surface upon which the groove or dado is desired to be cut. The saws A and B mark and remove the sides of the cut, making them perfectly straight and smooth, while the saw C removes that portion of the wood between the two side cuts.

It has been found by experience that with the ordinary wabble-saw used alone a variation in the speed at which it is run or pressure exerted upon it has a tendency to vary the width of the cut. Such variation is by its combination with the straight saws at the side, as above described, rendered impossible.

Having thus described my invention, what I claim to have invented, and desire to secure by Letters Patent, is—

1. In a dado-cutter, the combination of the outer saws, A and B, arranged a parallel distance apart, with a wabble-saw, C, intermediate of the saws A B and arranged at an angle thereto within the space between them, substantially as described.

2. In a dado-cutter, the combination of the outer saws, A B, arranged a parallel distance apart, with a wabble-saw, C, arranged in the space between the saws A B at an angle to said saws, the collars D, for supporting the saws, and fastening means, as E, substantially as described.

3. In a revolving dado-cutter, the combination of the wabble-saw C with the side saws, A and B, each side saw having a segment cut away, so as to permit the overlapping of the saw C, substantially as shown and described.

4. In a dado-cutter, the combination of the outer parallel saws, A B, a wabble-saw arranged at an angle to the outer saws and between the same, with the collars D, having outer parallel faces and inner inclined faces arranged to clamp the saw C between them, and with means for securing the parts together, substantially as described.

JONATHAN R. MENTZER.

Witnesses:
EDWARD B. ESCOTT,
ARTHUR C. DENISON.